United States Patent
Ye et al.

(10) Patent No.: US 12,526,904 B2
(45) Date of Patent: Jan. 13, 2026

(54) LOCATION DETERMINATION METHOD, DEVICE, TERMINAL DEVICE, AND STORAGE MEDIUM

(71) Applicant: Shenzhen Intellirocks Tech. Co., Ltd., Shenzhen (CN)

(72) Inventors: Jianli Ye, Shenzhen (CN); Wenlong Wu, Shenzhen (CN)

(73) Assignee: Shenzhen Intellirocks Tech. Co., Ltd., Shenzhen (CN)

(*) Notice: Subject to any disclaimer, the term of this patent is extended or adjusted under 35 U.S.C. 154(b) by 113 days.

(21) Appl. No.: 18/611,633

(22) Filed: Mar. 20, 2024

(65) Prior Publication Data
US 2024/0324087 A1   Sep. 26, 2024

(30) Foreign Application Priority Data
Mar. 24, 2023  (CN) .......................... 202310357568.8

(51) Int. Cl.
*H05B 47/175* (2020.01)
*H05B 47/155* (2020.01)

(52) U.S. Cl.
CPC ......... *H05B 47/196* (2024.01); *H05B 47/155* (2020.01)

(58) Field of Classification Search
None
See application file for complete search history.

(56) References Cited

U.S. PATENT DOCUMENTS

2018/0242430 A1* 8/2018 Gopal Samy ........ H05B 47/115

* cited by examiner

*Primary Examiner* — Kenneth B Wells
(74) *Attorney, Agent, or Firm* — Wenye Tan

(57) ABSTRACT

A location determination method is provided for a terminal device. The method includes obtaining at least two state images of a lighting system; determining profile information of the lighting system based on state changes of the lighting system in the at least two state images; based on configuration information of the lighting system, dividing the profile information to determine a location distribution of each lighting unit in the profile information; and displaying the profile information and the location distribution of the lighting units on a control interface of the terminal device. The configuration information includes at least one of a setting number of lighting units of the lighting system, a setting length of the lighting units, a setting shape of the lighting units, and a setting size of the lighting units.

19 Claims, 5 Drawing Sheets

LOCATION DETERMINATION METHOD, DEVICE, TERMINAL DEVICE, AND STORAGE MEDIUM

CROSS-REFERENCES TO RELATED APPLICATIONS

This application claims priority to Chinese Patent Application No. CN2023103575688, filed on Mar. 24, 2023, the content of which is hereby incorporated by reference in entirety.

FIELD OF THE TECHNOLOGY

The present disclosure relates to the technical field of lighting control technology and, in particular, to a location determination method, device, terminal device, and storage medium.

BACKGROUND OF THE DISCLOSURE

When a user uses a lighting system to customize its shape, a terminal device will display the specific locations of the lighting units arranged in order, after establishing a connection with the lighting system. The user can determine the specific location of each lighting unit in the lighting system by controlling the lighting units on the terminal device and comparing with the specific state of the lighting system.

However, determining the specific location of each lighting unit displayed on the terminal device in the lighting system through manual identification is relatively complex, inconvenient to operate, and difficult to remember.

The disclosed methods and apparatus are directed to solve solving one or more problems set forth above and other problems.

SUMMARY

According to one aspect of the present disclosure, a location determination method is provided for a terminal device. The method includes obtaining at least two state images of a lighting system; determining profile information of the lighting system based on state changes of the lighting system in the at least two state images; based on configuration information of the lighting system, dividing the profile information to determine a location distribution of each lighting unit in the profile information; and displaying the profile information and the location distribution of the lighting units on a control interface of the terminal device. The configuration information includes at least one of a setting number of lighting units of the lighting system, a setting length of the lighting units, a setting shape of the lighting units, and a setting size of the lighting units.

According to another aspect of the present disclosure, a terminal device is provided for lighting location determination. The terminal device includes a memory for storing an application program; and at least one processor coupled to the memory for executing the application program to perform: obtaining at least two state images of a lighting system; determining profile information of the lighting system based on state changes of the lighting system in the at least two state images; based on configuration information of the lighting system, dividing the profile information to determine a location distribution of each lighting unit in the profile information; and displaying the profile information and the location distribution of the lighting units on a control interface of the terminal device. The configuration information includes at least one of a setting number of lighting units of the lighting system, a setting length of the lighting units, a setting shape of the lighting units, and a setting size of the lighting units.

According to another aspect of the present disclosure, a non-transitory computer-readable storage medium is provided. The non-transitory computer-readable storage medium contains computer-executable instructions for, when executed by one or more processors, performing a location determination method. The method includes obtaining at least two state images of a lighting system; determining profile information of the lighting system based on state changes of the lighting system in the at least two state images; based on configuration information of the lighting system, dividing the profile information to determine a location distribution of each lighting unit in the profile information; and displaying the profile information and the location distribution of the lighting units on a control interface of the terminal device. The configuration information includes at least one of a setting number of lighting units of the lighting system, a setting length of the lighting units, a setting shape of the lighting units, and a setting size of the lighting units.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. The accompanying drawings in the following description merely show some embodiments of the present disclosure, and a person of ordinary skill in the technology may derive other drawings from these accompanying drawings without creative efforts.

DETAILED DESCRIPTION

Figure 1:
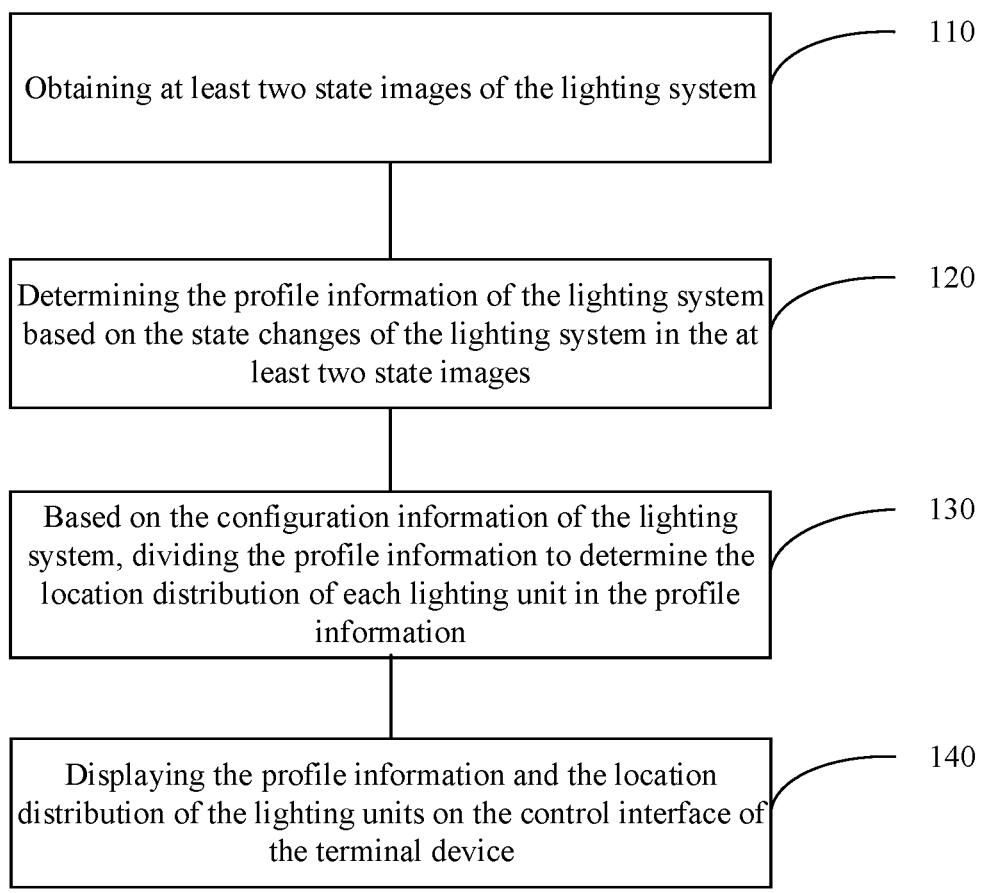
FIG. 1 illustrates a schematic flowchart of a location determination method according to an embodiment of the present disclosure.

The following describes exemplary embodiments in detail, and examples of the embodiments are shown in the accompanying drawings, so as to better understand the present disclosure. Unless otherwise specified, the same number in different drawings may represent the same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

When a user uses a lighting system to customize the shape (that is, to arrange the lighting system into a customized shape, such as splicing multiple square lights into the shape of a cross, etc.), generally, after establishing a connection with the lighting system, the terminal device only displays the specific location of the lighting units arranged in order.

However, the actual shape of the lighting system cannot be reflected. The user needs to manually and sequentially control the lighting units arranged in order on the terminal device, and to compare the state changes of different positions of the lighting system to determine the specific location of the each lighting unit on the terminal device in the lighting system.

However, determining the specific location of each lighting unit displayed on the terminal device in the lighting system through manual identification is relatively complex, inconvenient to operate, and difficult to remember.

To overcome the above problems, the present disclosure provides a location determination method, device, terminal device, and storage medium for use in the terminal device. The method includes: obtaining at least two state images of a lighting system; determining profile information of the lighting system based on state changes of the lighting system in the at least two state images; based on configuration information of the lighting system, dividing the profile information to determine a location distribution of each lighting unit in the profile information; and displaying the profile information and the location distribution of the lighting units on a control interface of the terminal device. The configuration information includes at least one of a setting number of lighting units of the lighting system, a setting length of the lighting units, a setting shape of the lighting units, and a setting size of the lighting units.

Accordingly, by corresponding the actual shape of the lighting system and the location of the lighting units to the profile information displayed on the terminal device, it makes easier for the user to control the lighting system through the terminal device more intuitively and visually, improving the user experience. The following describes more details.

Referring to FIG. 1, FIG. 1 shows a schematic flowchart of a location determination method according to an embodiment of the present disclosure. The method may be applicable to a terminal device, and may include Step 110 to Step 140.

In step 110, at least two state images of the lighting system are obtained.

In the embodiments of the present disclosure, the lighting system may include a linear lighting system, a nonlinear lighting system, or both. The linear lighting system may include a light strip or a light string, and the nonlinear lighting system may include a polygonal lighting system such as a square light.

The state images are images of the lighting system in different operation states. For example, an image in which the lighting system is turned off; an image in which the lighting system is turned on; or an image in which the lighting system is in a red light state, etc.

In some embodiments, video recording can be performed by 360-degree shooting around the lighting system to obtain videos of the lighting system in different operation states, and then screenshots can be taken from the videos to obtain at least two state images of the lighting system; or photographs can be taken to obtain at least two state images of the lighting system.

The at least two state images of the lighting system are obtained so that, in subsequent steps, specific information of the lighting system, such as the profile or the contour of the actual shape of the lighting system, can be determined based on changes in the images of different states.

In step 120, the profile information of the lighting system is determined based on the state changes of the lighting system in the at least two state images.

In some embodiments, image processing and recognition processing is used to process the at least two state images obtained by photo shooting or video recording. For example, image processing is used to perform noise reduction processing on the obtained state images to obtain clearer state images, and the state images are recognized by the image recognition processing. Based on the recognized differences between different state images (for example, the difference in light color), the profile information of the lighting system displayed on the terminal device can be determined. The profile information may be represented as a line image, a block image, a color image, a general image, texts, or a mixed image and texts, etc., and the image or texts may be segmented (e.g., having multiple segments, and each segment may be operated on or controlled individually). Other forms of the profile information may also be used.

The profile information of the lighting system is determined so that, in subsequent steps, the terminal device can display the actual shape (profile information or contour information) of the lighting system to match the shape of the lighting system with the profile information displayed on the terminal device. Thus, the user can, based on the profile information displayed on the terminal device, perform corresponding operations on the lighting system.

In some embodiments, the at least two state images may include state images in which the lighting system is in at least two different operation states. Each lighting unit in the lighting system may have a different corresponding state when the lighting system is in a different operation state. The different corresponding states of the lighting unit when the lighting system is in different operation states may include that the lighting unit being in an on state or an off state. The different corresponding states of the lighting unit when the lighting system is in different operation states may also include that the light of the lighting unit having different lighting parameters, such as different color states (such as a red light state or a green light state), different brightness states (such as a high brightness state or a low brightness state), etc. Other states may also be included without limitation.

More specifically, the process of determining the profile information of the lighting system based on the state changes of the lighting system in the at least two state images may also include the following.

(1) Determining the operation area where the lighting system switches operation states based on the state images in different operation states.

(2) Determining the profile information of the lighting system according to the operation area.

In the embodiments of the present disclosure, the operation area where the lighting system performs operation switching is determined through the difference of state images in different operation states, and the profile information of the lighting system is determined according to the profile or contour distribution of the operation area. For example, FIG. 2 shows a schematic structural diagram of state image A and state image B according to an embodiment of the present disclosure.

Figure 2:
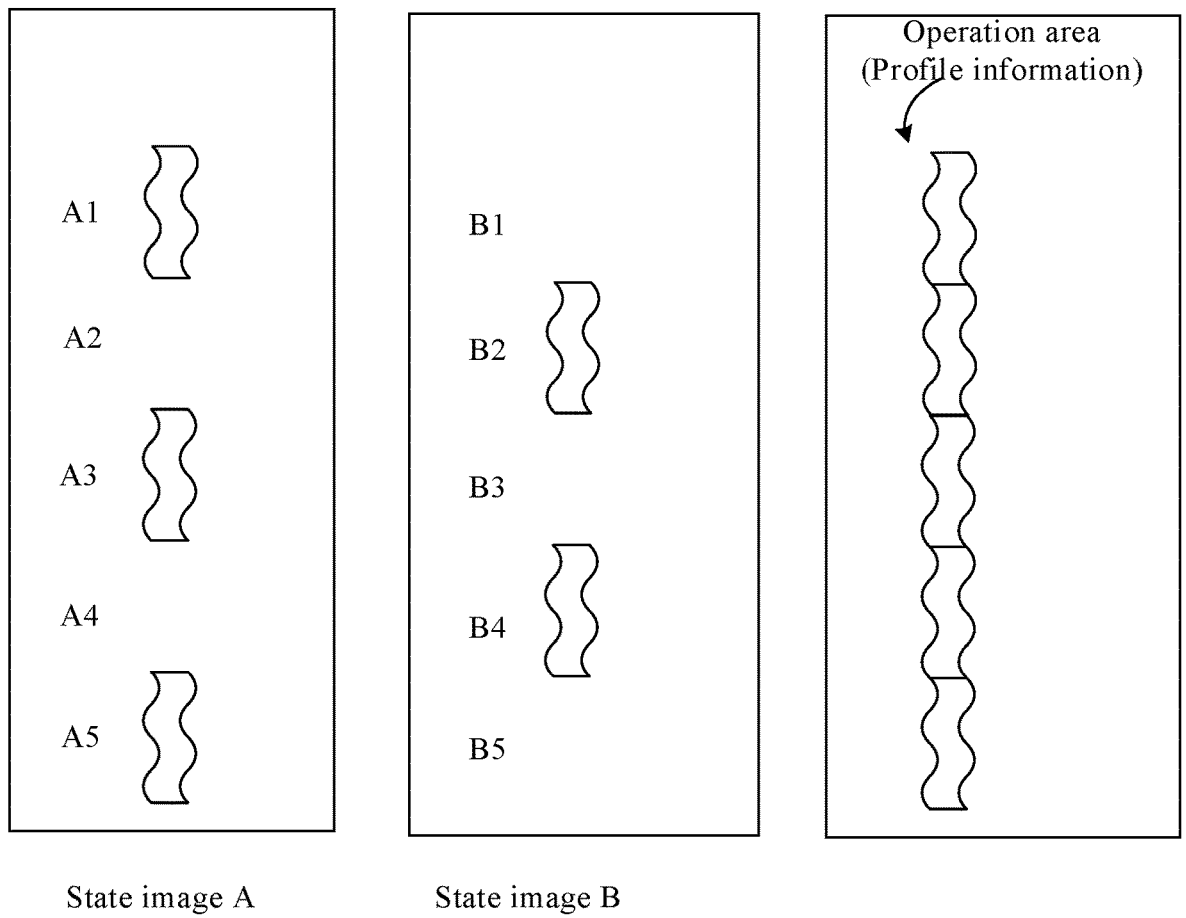
FIG. 2 illustrates a schematic diagram of a state image A and a state image B according to an embodiment of the present disclosure.

As shown in FIG. 2, Position A1 in state image A corresponds to Position B1 in state image B. Position A2 in the state image A corresponds to Position B2 in state image B, and so on. Position A3 and Position B3, Position A4 and Position B4, and Position A5 and Position B5 respectively correspond to each other. Through the processing and recognition of the state image A and the state image B, it can be determined that there are differences between the Positions A1, A2, A3, A4, and A5 in the state image A and the Positions B1, B2, B3, B4, and B5 of the state image B (A1, A3, and A5 are in the on state, A2 and A4 are in the off state, B2 and B4 are in the on state, and B1, B3, and B5 are in the off state, and so on), and it can be determined that the Positions A1, B2, A3, B4, and A5 together form the operation area. Further, the profile information of the lighting system can be determined based on the profile or contour distribution of the operation area.

In real practice, due to external interference, for example, when the environment where the lighting system is located is bright, the light emitted by the lighting system is not obvious, resulting in a large deviation between the profile information subsequently determined based on the state images and the actual shape of the lighting system. In order to improve the accuracy of the profile information, in some embodiments, the process of determining the profile information of the lighting system according to the operation area may include the following steps.

(1) Determining a matching degree between each two different operation areas in at least two operation areas.

(2) Determining the profile information of the lighting system based on the operation area whose matching degree is greater than a preset matching threshold.

In the embodiments of the present disclosure, the matching degree between each two different operation areas can be determined based on the area of the overlapping area between each two different operation areas.

Through the difference of the state images in different operation states, at least two operation areas where the lighting system switches operation can be determined, and the matching degree between the operation areas can be determined according to the profile or contour distribution between each two operation areas. Further, the profile information of the lighting system can be determined based on the operation areas with the matching degree greater than the preset matching threshold. For example, assuming that the preset matching threshold is 80% and the matching degree between operation area A and operation area B is 82%, the profile information of the lighting system can be determined according to operation area A or operation area B, or both. For example, the profile information of the lighting system can be determined based on one of the smaller operation areas. For another example, the profile information of the lighting system can be determined based on one of the larger operation areas.

When the shape of the lighting system is relatively complex, the profile information determined by the state images of the lighting system in different directions cannot accurately represent the actual shape of the lighting system. For example, when the user stands in other directions of the lighting system, the user cannot correspond the profile information to the actual shape of the lighting system. No matter where the user stands in any direction of the lighting system, in order to assist the user to correspond the profile information to the actual shape of the lighting system, in some embodiments, the state images include at least two sub-images of the lighting system in different operation states in each direction or orientation.

In some embodiments, the process of determining an operation area for the lighting system to switch operation states based on the state images in different operation states may also include: based on at least two state sub-images in different operation states corresponding to each direction, determining the operation area where the lighting system switches operation states in each direction.

For example, the at least two state sub-images in different operation states corresponding to each direction may indicate that the first state sub-image of the lighting system in a different direction when the lighting system in one of the state sub-images is in a red light state, and another state sub-image can indicate the second state sub-image of the lighting system in a different direction when the lighting system is in the green light state. Based on the first state sub-image and the second state sub-image in the same direction, the profile information of the lighting system corresponding to this direction can be determined.

According to the operation areas in different directions, the relatively complete profile information of the lighting system in a three-dimensional space may be restored. More specifically, the process of determining the profile information of the lighting system according to the operation areas can also include: according to the operation area corresponding to each direction, determining the profile information of the lighting system in each direction.

For example, when the light of the lighting system is in the green light state, the front-view first state sub-image, the rear-view first state sub-image, the left-view first state sub-image, the right-view first state sub-image, the down-view first state sub-image, and the up-view first state sub-image of the lighting system are respectively obtained. Further, when the light of the lighting system is in the red light state, the front-view second state sub-image, the rear-view second state sub-image, the left-view second state sub-image, the right-view second state sub-image, the down-view second state sub-image, and the up-view second state sub-image of the lighting system are also respectively obtained. Based the difference between the front-view first state sub-image and the front-view second state sub-image, the operation area of the lighting system in the front-view direction can be determined. The operation area of the lighting system in the rear-view direction can be determined through the difference between the first rear-view state sub-image and the second rear-view state sub-image. Similarly, the operation areas of the lighting system in the left-view direction, the right-view direction, the down-view direction, and the up-view direction can also be determined. Further, based on the operation areas in the six directions, the relatively complete profile information of the lighting system in the three-dimensional space can be inferred and restored.

By determining the relatively complete profile information of the lighting system in the three-dimensional space, the user can adjust the display angle of the profile information displayed on the terminal device according to the actual direction of the lighting system, so that the user can see the actual shape of the lighting structure corresponding to the profile information displayed on the terminal device.

In step 130, based on the configuration information of the lighting system, the profile information is divided and the location distribution of each lighting unit in the profile information is determined.

In the embodiments of the present disclosure, a lighting unit includes a control unit and at least one lamp unit controlled by the control unit. That is, one lighting unit corresponds to at least one lamp unit. That is to say, one control unit can control different numbers of lamp units. For example, a lighting unit can control from one to six lamp units. The control unit is the control carrier of the lighting system, the control unit can be a micro electronic device (integrated circuit chip or IC), and the lamp unit can be a lamp bead, etc.

In some embodiments, the control units are evenly distributed in the lighting system. For example, when the lighting system is a light strip, the control units are equally spaced along the light strip.

By controlling the control units, the lighting in the corresponding areas of the lighting system can be changed. The size of the area that can be controlled by one control unit can be varied.

In the embodiments of the present disclosure, the configuration information includes at least one of setting the number of lighting units of the lighting system, setting the length of the lighting units, setting the shape of the lighting units, and setting the size of the lighting system. The setting number may indicate the number of control units of the lighting system; the setting length can indicate the distance between different lamp units in the lighting unit; the setting shape can indicate the shape of the lighting unit, for example, the setting shape can be any shape such as a square or rectangle; the setting size can indicate dimensional information such as the length or area of the lighting unit, etc.

In some embodiments, the process of dividing the profile information based on the configuration information of the lighting system and determining the location distribution of each lighting unit in the profile information may include: according to the configuration information, evenly dividing the profile information into at least one setting sub-profile, and each setting sub-profile corresponds to one of the lighting units.

In some embodiments, the connection between the terminal device and the lighting system can be established through a wireless connection such as Bluetooth. For example, the Bluetooth device corresponding to the lighting system on the control page of the terminal device can be clicked to determine which lighting system the terminal device is connected to.

In the embodiments of the present disclosure, after the terminal device establishes a connection with the lighting system, the lighting system sends the number of control units to the terminal device, so that the terminal device obtains the number of control units corresponding to the lighting system. Based on the number of control units, the setting number of the control units can be determined.

In some embodiments, setting the number of control units, setting the length, setting the shape, or setting the size of different categories of lighting systems may be stored on the terminal device, and the setting number of lighting units can be determined according to the stored setting number of control units. For example, by entering the device number information of a certain lighting system on the control page of the terminal device, the terminal device can determine the corresponding lighting system based on the device number, and retrieve the corresponding setting number of control units, setting length, setting shape, or setting size for the lighting system.

Based on setting the number, setting the length, setting the shape, or setting the size of the lighting units corresponding to the lighting system, the profile information is evenly divided to obtain at least two setting sub-profiles. For example, the setting number of the lighting units corresponding to the lighting system (for example, the lighting system is a light strip) is 6, and the profile information is evenly divided into 6 setting sub-profiles; or, the setting shape is a square, and the profile information is evenly divided into square-shaped setting sub-profiles; or, the setting length is 2 and, according to the known number of lamp units existing in a lighting unit, the length of a lighting unit can be calculated, and the profile information is evenly divided into setting sub-profiles of corresponding length; or, the setting size is the length of the lighting unit, the setting size is 6, and the profile information is evenly divided into setting sub-profiles of length 6.

The obtained location of each setting sub-profile is the location distribution of the lighting unit corresponding to the setting sub-profile.

Figure 3:
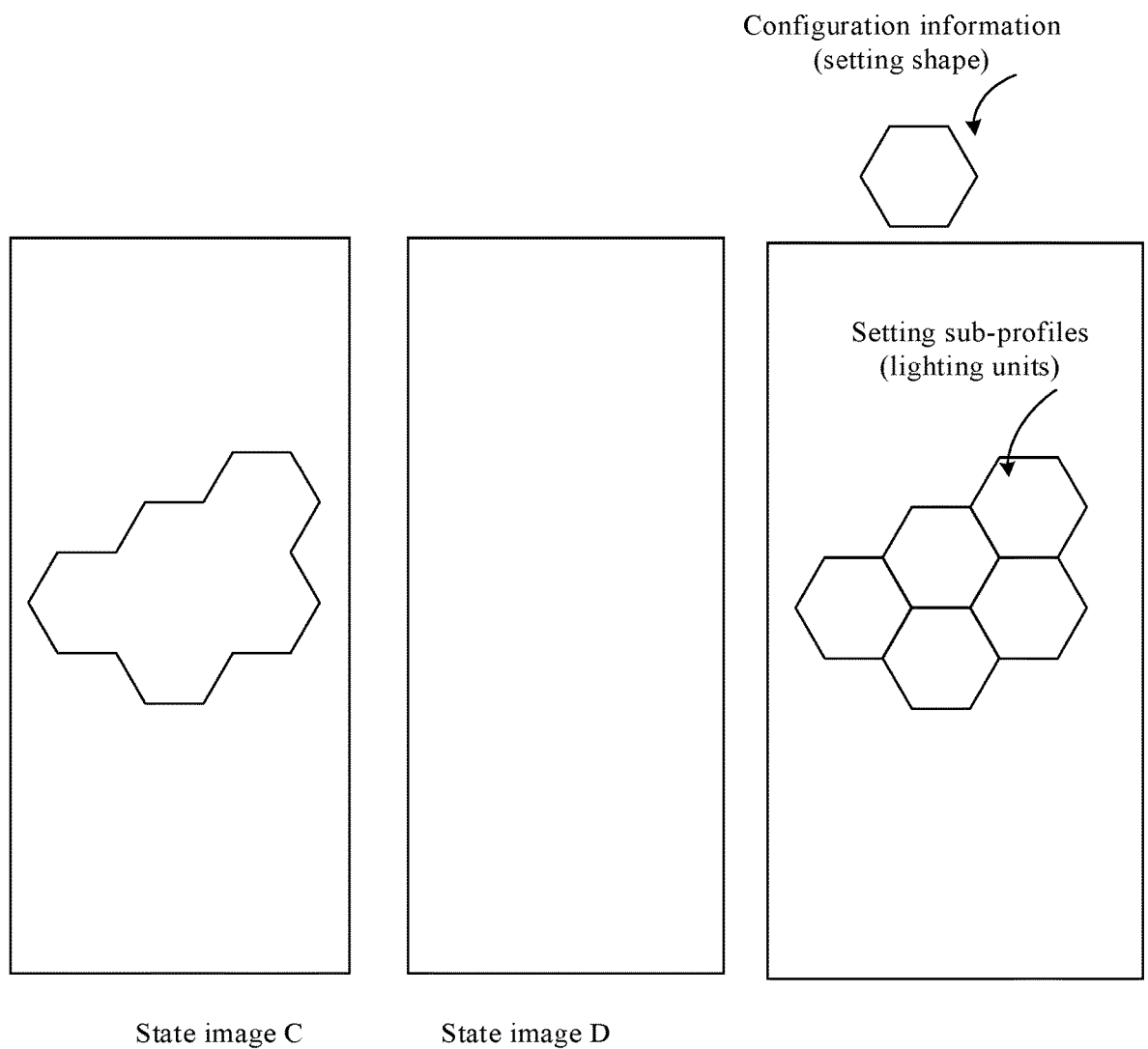
FIG. 3 illustrates a schematic diagram of a state image C and a state image D according to an embodiment of the present disclosure.

For example, to FIG. 3, shows a schematic structural diagram of state image C and state image D according to an embodiment of the present disclosure. The state image C, corresponding to the lighting system in which all the lighting units are in the on or lighting state, and the state image D, corresponding to the lighting system in which all the lighting units are in the off state, are respectively obtained. Based on the difference between the state image C and the state image D, the profile information d is determined. Further, the profile information d is evenly divided into five (5) setting sub-profiles according to the setting shape of the lighting unit, and each setting sub-profile is the location distribution of the corresponding lighting unit.

In step 140, the profile information and the location distribution of the lighting units are displayed on the control interface of the terminal device.

The terminal device displays the profile information and the location distribution of the lighting units. The location distribution of each lighting unit can indicate the location distribution of the control unit within each lighting unit, so that the actual shape of the lighting system can be matched with the profile information displayed on the terminal device. The specific location distribution of each lighting unit is visualized in the profile information (that is, the location distribution of each control unit is visualized). Thus, the user can more intuitively correspond what is displayed on the control interface of the terminal device to the actual shape of the lighting system. The user can more intuitively and conveniently determine the specific location of the lighting unit to be controlled in the profile information and the specific location of the lamp unit controlled by the lighting unit in the actual shape of the lighting system.

By using the terminal device to realize the correspondence between the lighting units of the lighting system and the setting sub-profiles, the user can click on the location distribution of the lighting unit displayed on the terminal device to realize point-to-point lighting control of the lighting system. In some embodiments, the actual shape of the lighting system may be symmetrical, for example, if the lighting system is a light strip and the shape of the light strip is distributed along a straight line, the user may be unable to match the top of the profile information with the actual shape of the lighting system.

In some embodiments, the location determination method may further include the following steps.

(1) Obtaining the starting end confirmation information.

(2) Determining the location of the starting end in the profile information based on the starting end confirmation information.

In some embodiments, the starting end confirmation information can be inputted by the user. For example, the user may observe and determine which end of the lighting system is connected to the power supply, and further inputs this end into the terminal device as the starting end of the profile information.

In some embodiments, the starting end confirmation information can be determined according to the electrical current direction of the lighting system and, specifically, the process of determining the electrical current direction can include the following steps.

(1) Obtaining multiple direction images of the lighting system.

The multiple directional images are obtained by sequentially switching the operation states of the lamp units corresponding to the lighting units according to the setting order of the multiple lighting units. For example, the lighting system is a light strip, and six control units are provided on the light strip. The lighting units corresponding to the control units are sequentially controlled according to the installation order of the control units, so that the lamp unit connected to the control unit is in the on state (lamp units controlled by other lighting units are in the off state), even if the corresponding lighting unit is on. Thus, six directional images can be obtained; or the light strip can be controlled to run a horse racing (or round-robin) light effect, and images of the lighting system can be obtained according to a preset time interval, and a set of directional images can be obtained.

(2) Determining the setting direction of the lighting system based on the acquisition sequence of the multiple directional images and the state changes of adjacent directional images.

That is, according to the order in which the directional images are obtained, and the difference between adjacent directional images, the setting direction of the lighting system can be determined.

After determining the setting direction of the lighting system, the process of obtaining the starting end confirmation information may also include: determining the starting end confirmation information according to the setting direction.

In the embodiments of the present disclosure, the electrical current direction can be determined according to the setting direction, that is, the electrical current input end can be determined.

By confirming the location of the starting end in the profile information, the user can be provided with a direction when operating on the profile information, facilitating the user to control the corresponding lighting unit more intuitively and conveniently.

Further, in some embodiments, the process of displaying the profile information and the location distribution of the lighting units on the control interface of the terminal device may include: displaying the profile information, the location distribution of the lighting units, and the starting end on the control interface of the terminal device.

The control interface of the terminal device displays the profile information, the location distribution of the lighting units corresponding to each setting sub-profile, and the starting end of the profile information, and the actual shape of the lighting system can correspond to what is displayed on the terminal device, making it easier for the user to visually and intuitively control the lighting system through the terminal device, thereby improving the user experience.

Accordingly, by obtaining state images of different states of the lighting system, the profile information of the lighting system in different directions can be determined according to the state images of the lighting system, so as to achieve correspondence between the actual shapes of the lighting system in different directions and the profile information. Further, for the lighting units evenly distributed in the lighting system, according to the setting number of lighting units in the lighting system, the lighting units can be evenly divided into the setting number of setting sub-profiles. Each setting sub-profile is the location distribution of the lighting unit of the setting sub-profile, and the location distribution of the lighting unit can be replaced with the sub-profile of the lighting unit, so that the correspondence between the actual shape of the lighting system and the location distribution of the lighting units and the location distribution of the control unit can be realized visually on the terminal device, thereby making it easier for the user to intuitively and visually control the lighting system through the terminal device, improving the user experience.

Figure 4:
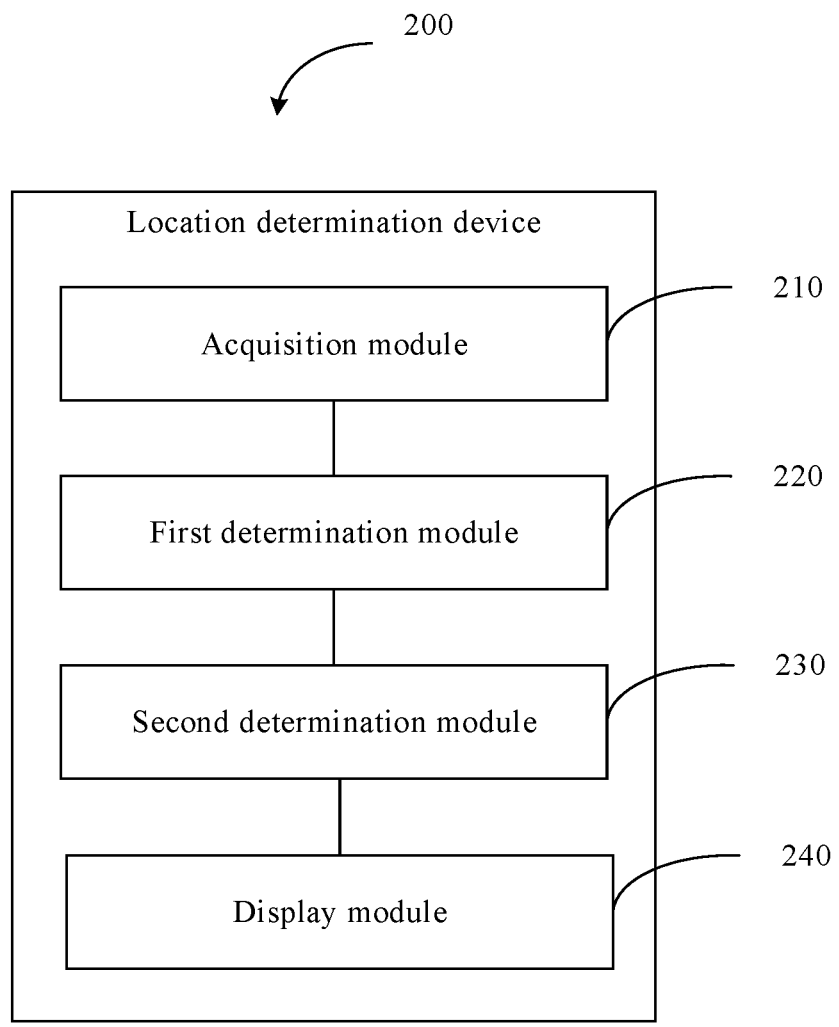
FIG. 4 illustrates a schematic diagram of a location determination device according to an embodiment of the present disclosure.

FIG. 4 shows a schematic structural diagram of a location determination device 200 according to an embodiment of the present disclosure, which may be applicable to a terminal device. The location determination device 200 includes: an acquisition module 210, a first determination module 220, a second determination module 230, and a display module 240.

More specifically, the acquisition module 210 may be used to obtain at least two state images of the lighting system.

The first determination module 220 is configured to determine the profile information of the lighting system based on the state changes of the lighting system in the at least two state images.

In some embodiments, the at least two state images include at least two state images of the lighting system in different operation states, and each lighting unit in the lighting system has a different corresponding state when the lighting system is in a different operation states. The first determination module 220 may also include a first determination sub-module and a second determination sub-module.

The first determination sub-module is used to determine the operation area where the lighting system switches operation states based on the state images in different operation states. The second determination sub-module is used to determine the profile information of the lighting system according to the operation area.

In some implementations, the number of operation areas is at least two, and the second determination sub-module may further include a third determination sub-module and a fourth determination sub-module.

The third determination sub-module is used to respectively determine the matching degree between each two different operation areas in the at least two operation areas. The fourth determination sub-module is used to determine the profile information of the lighting system based on the operation area whose matching degree is greater than the preset matching threshold.

In some embodiments, the state images includes at least two state sub-images of the lighting system in different operation states in each direction. The first determination sub-module may also include a fifth determination sub-module.

The fifth determination sub-module is used to determine the operation area where the lighting system switches operation states in each direction based on the at least two state sub-images in different operation states corresponding to each direction.

In some embodiments, the second determination sub-module may also include a sixth determination sub-module. The sixth determination sub-module is used to determine the profile information of the lighting system in each direction according to the operation area corresponding to each direction.

The second determination module 230 is configured to divide the profile information based on the configuration information of the lighting system, and to determine the location distribution of each lighting unit in the profile information.

The configuration information includes at least one of setting the number of lighting units, setting the length of the lighting units, setting the shape of the lighting units, and setting the size of the lighting units of the lighting system.

In some embodiments, the second determination module 230 may also include a first dividing module. The first dividing module is used to evenly divide the profile information into at least one setting sub-profile according to the configuration information, and each setting sub-profile corresponds to one of the lighting units.

The display module 240 is used to display the profile information and the location distribution of the lighting units on the control interface of the terminal device.

In some embodiments, the location determination device 200 may include a starting end determination module, and a seventh determination sub-module. The starting end determination module is used to obtain the starting end confirmation information. The seventh determination sub-module is used to determine the location of the starting end in the profile information based on the starting end confirmation information.

In some embodiments, the display module 240 may also include a display sub-module. The display sub-module is used to display the profile information, the location distribution of the lighting units, and the starting end on the control interface of the terminal device.

In some embodiments, the lighting system further includes at least one light unit. The location determination device 200 may include a first acquisition module, and an eighth determination sub-module.

The first acquisition module is used to acquire multiple directional images of the lighting system. The multiple directional images are obtained by sequentially switching the operation states of the lamp units corresponding to the lighting units according to the setting order of the multiple lighting units.

The eighth determination sub-module is used to determine the setting direction of the lighting system based on the acquisition sequence of multiple directional images and the state changes of adjacent directional images.

In some embodiments, the starting end determination module may also include a ninth determination sub-module. The ninth determination sub-module is used to determine the starting end confirmation information according to the setting direction.

Those skilled in the art can understand that for the convenience and simplicity of description, the specific operation processes of the above-described devices and modules will be referred to the corresponding processes in the foregoing method embodiments, and will not be repeated again herein.

In several embodiments provided in this disclosure, the coupling or direct coupling or communication connection between the modules shown or discussed may be through some interfaces, and the indirect coupling or communication connection of the devices or modules may be electrical, mechanical or other form.

In addition, each functional module in embodiments of the present disclosure can be integrated into one processing module, or each module can exist physically alone, or two or more modules can be integrated into one module. The above integrated modules can be implemented in the form of hardware or software function modules.

Figure 5:
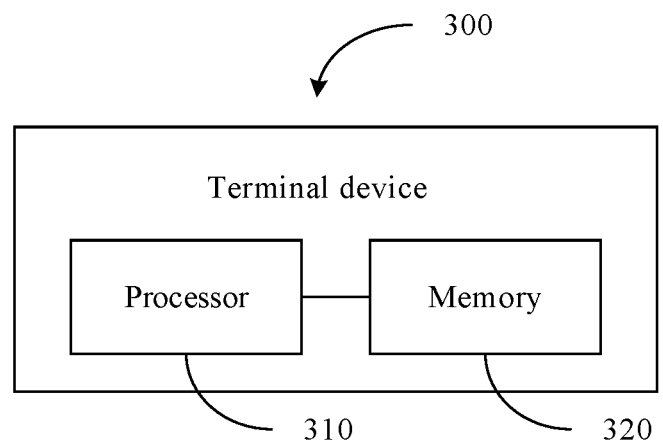
FIG. 5 illustrates a schematic diagram of a terminal device according to an embodiment of the present disclosure.

FIG. 5 is a schematic structural diagram of a terminal device 300 according to an embodiment of the present disclosure. The terminal device 300 in the present disclosure may include one or more of the following components: a processor 310 (one or more processors), a memory 320, and one or more application programs. The processor 310 may be a hardware IC and the memory 320 may be one or more memory chips coupled to the processor 310. The one or more application programs may be stored in the memory 320 and configured to be executed by one or more processors 310, and the one or more programs are configured to perform the location determination method as described in the foregoing method embodiments.

Processor 310 may include one or more processing cores. The processor 310 uses various interfaces and buses to connect various parts of the entire terminal device 300, and executes various functions of the terminal device 300 and processes data by running or executing instructions, programs, code sets or instruction sets stored in the memory 320, and calling data stored in the memory 320. Optionally, the processor 310 may be implemented in at least one hardware form of digital signal processing (DSP), field-programmable gate array (FPGA), and programmable logic array (PLA). The processor 310 may integrate one or a combination of a central processing unit (CPU), a graphics processor (GPU), a modem, etc. Among them, the CPU mainly handles the operating system, user interface, and applications; the GPU is responsible for rendering and drawing the display content; and the modem is used to handle wireless communications. It can be understood that the above-mentioned modem does not need to be integrated into the processor 310 and may be implemented solely through a communication chip.

The memory 320 may include random access memory (RAM) or read-only memory (Read-Only Memory). Memory 320 may be used to store instructions, programs, codes, sets of codes, or sets of instructions. The memory 320 may include a program storage area and a data storage area, where the program storage area may store instructions for implementing an operating system, instructions for implementing at least one function, instructions for implementing various method embodiments described and the like. The storage data area can also store data created by the terminal device 300 during use.

Figure 6:
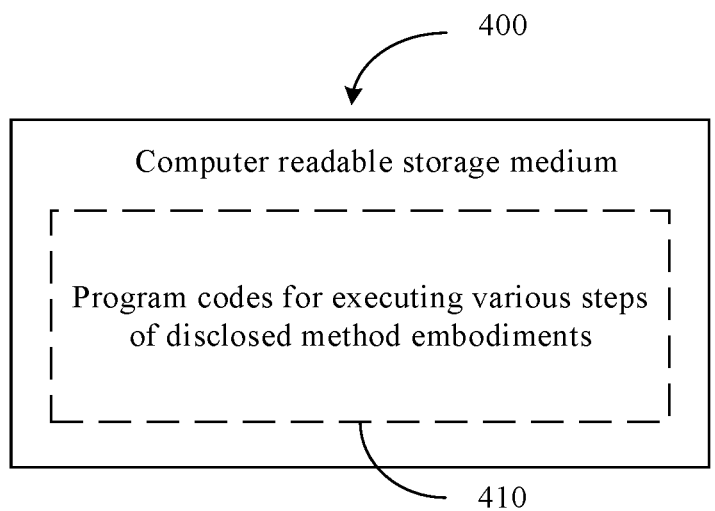
FIG. 6 illustrates a schematic diagram of a computer-readable storage medium according to an embodiment of the present disclosure.

FIG. 6 shows a schematic structural diagram of a computer-readable storage medium according to an embodiment of the present disclosure.

Program code is stored in the computer-readable medium 400, and the program code can be called by a processor to execute the determination methods described in the above described embodiments. Program code is stored in the computer-readable medium 400, and the program code can be called by a processor to execute the determination methods described in the above described embodiments.

Computer readable storage medium 400 may be electronic memory such as flash memory, EEPROM (Electrically Erasable Programmable Read Only Memory), EPROM, hard disk, or ROM. Optionally, the computer-readable storage medium 400 may include any non-transitory computer-readable storage medium. The computer-readable storage medium 400 has storage space for the program code 410 that performs any or all method steps in the above-described methods. These program codes can be read from or written into one or more computer program devices. Program code 410 may, for example, be compressed in a suitable form.

The above are merely certain embodiments of the present disclosure, and are not intended to limit the scope of the present disclosure. Any equivalent structure or equivalent process transformation made by using the specification and drawings of the present disclosure, or any direct or indirect application in other related technologies fields, are all included in the protection scope of this disclosure.

What is claimed is:

1. A location determination method for a terminal device, comprising:
    obtaining at least two state images of a lighting system including a plurality of lighting units;
    determining profile information of the lighting system based on state changes of the lighting system in the at least two state images;
    based on configuration information of the lighting system, dividing the profile information to determine a location distribution of each lighting unit in the profile information, wherein the configuration information includes at least one of setting a number of lighting units of the lighting system, setting a length of the lighting units, setting a shape of the lighting units, and setting a size of the lighting units; and
    displaying the profile information and the location distribution of the lighting units on a control interface of the terminal device.

2. The method according to claim 1, wherein:
    the at least two state images include at least two state images of the lighting system in different operation states, wherein each lighting unit in the lighting system is in a different corresponding state when the lighting system is in different operation states; and
    the determining profile information of the lighting system based on state changes of the lighting system in the at least two state images includes:
    determining operation areas where the lighting system switches operation states according to the state images in different operation states; and
    determining the profile information of the lighting system based on the operation areas.

3. The method according to claim 2, wherein:
    the number of the operation areas is at least two; and
    the determining the profile information of the lighting system based on the operation areas includes:
    respectively determining a matching degree between each two different operation areas in the at least two operation areas; and
    determining the profile information of the lighting system according to an operation area having a matching degree greater than a preset matching threshold.

4. The method according to claim 2, wherein:
    the state images include at least two state sub-images of the lighting system in different operation states in each direction;
    the determining operation areas where the lighting system switches operation states according to the state images in different operation states includes:
    determining the operation areas where the lighting system switches operation states in each direction based on the at least two state sub-images in different operation states corresponding to each direction; and
    the determining the profile information of the lighting system based on the operation areas includes:
    determining the profile information of the lighting system in each direction according to the operation areas corresponding to each direction.

5. The method according to claim 1, wherein, based on the configuration information of the lighting system, the dividing profile information to determine a location distribution of each lighting unit in the profile information further includes:
    evenly dividing the profile information into at least two setting sub-profiles according to the configuration information, each setting sub-profile corresponding to one of the lighting units.

6. The method according to claim 1, further comprising:
    obtaining starting end confirmation information; and
    determining a location of a starting end in the profile information based on the starting end confirmation information,
    wherein the displaying the profile information and the location distribution of the lighting units on a control interface of the terminal device includes:
    displaying the profile information, the location distribution of the lighting units, and the starting end on the control interface of the terminal device.

7. The method of claim 6, wherein each lighting unit further includes at least one lamp unit, and the method includes:
    obtaining multiple directional images of the lighting system, wherein the multiple directional images are obtained by sequentially switching the operation states of the lamp units corresponding to the lighting units according to a setting sequence of the multiple lighting units; and
    determining a setting direction of the lighting system according to an acquisition sequence of the multiple directional images and state changes of adjacent directional images,
    wherein the obtaining starting end confirmation information includes:
    determining the starting end confirmation information according to the determined setting direction.

8. A terminal device for lighting location determination, comprising:
    a memory for storing an application program; and
    at least one processor coupled to the memory for executing the application program to perform:
    obtaining at least two state images of a lighting system including a plurality of lighting units;
    determining profile information of the lighting system based on state changes of the lighting system in the at least two state images;
    based on configuration information of the lighting system, dividing the profile information to determine a location distribution of each lighting unit in the profile information, wherein the configuration information includes at least one of setting a number of lighting units of the lighting system, setting a length of the lighting units, setting a shape of the lighting units, and setting a size of the lighting units; and
    displaying the profile information and the location distribution of the lighting units on a control interface of the terminal device.

9. The terminal device according to claim 8, wherein:
the at least two state images include at least two state images of the lighting system in different operation states, wherein each lighting unit in the lighting system is in a different corresponding state when the lighting system is in different operation states; and
the determining profile information of the lighting system based on state changes of the lighting system in the at least two state images includes:
determining operation areas where the lighting system switches operation states according to the state images in different operation states; and
determining the profile information of the lighting system based on the operation areas.

10. The terminal device according to claim 9, wherein:
the number of the operation areas is at least two; and
the determining the profile information of the lighting system based on the operation areas includes:
respectively determining a matching degree between each two different operation areas in the at least two operation areas; and
determining the profile information of the lighting system according to an operation area having a matching degree greater than a preset matching threshold.

11. The terminal device according to claim 9, wherein:
the state images include at least two state sub-images of the lighting system in different operation states in each direction;
the determining operation areas where the lighting system switches operation states according to the state images in different operation states includes:
determining the operation areas where the lighting system switches operation states in each direction based on the at least two state sub-images in different operation states corresponding to each direction; and
the determining the profile information of the lighting system based on the operation areas includes:
determining the profile information of the lighting system in each direction according to the operation areas corresponding to each direction.

12. The terminal device according to claim 8, wherein, based on configuration information of the lighting system, dividing the profile information to determine a location distribution of each lighting unit in the profile information includes:
evenly dividing the profile information into at least two setting sub-profiles according to the configuration information, each setting sub-profile corresponding to one of the lighting units.

13. The terminal device according to claim 8, wherein the processor further performs:
obtaining starting end confirmation information; and
determining a location of a starting end in the profile information based on the starting end confirmation information,
wherein the displaying the profile information and the location distribution of the lighting units on a control interface of the terminal device includes:
displaying the profile information, the location distribution of the lighting units, and the starting end on the control interface of the terminal device.

14. The terminal device of claim 13, wherein each lighting unit further includes at least one lamp unit, and the processor further performs:
obtaining multiple directional images of the lighting system, wherein the multiple directional images are obtained by sequentially switching the operation states of the lamp units corresponding to the lighting units according to a setting sequence of the multiple lighting units;
determining a setting direction of the lighting system according to an acquisition sequence of the multiple directional images and state changes of adjacent directional images,
wherein the obtaining starting end confirmation information includes:
determining the starting end confirmation information according to the setting direction.

15. A non-transitory computer-readable storage medium containing computer-executable instructions for, when executed by one or more processors, performing a location determination method, the method comprising:
obtaining at least two state images of a lighting system including a plurality of lighting units;
determining profile information of the lighting system based on state changes of the lighting system in the at least two state images;
based on configuration information of the lighting system, dividing the profile information to determine a location distribution of each lighting unit in the profile information, wherein the configuration information includes at least one of setting a number of lighting units of the lighting system, setting a length of the lighting units, setting a shape of the lighting units, and setting a size of the lighting units; and
displaying the profile information and the location distribution of the lighting units on a control interface of a terminal device.

16. The non-transitory computer-readable storage medium according to claim 15, wherein:
the at least two state images include at least two state images of the lighting system in different operation states, wherein each lighting unit in the lighting system is in a different corresponding state when the lighting system is in different operation states; and
the determining profile information of the lighting system based on state changes of the lighting system in the at least two state images includes:
determining operation areas where the lighting system switches operation states according to the state images in different operation states; and
determining the profile information of the lighting system based on the operation areas.

17. The non-transitory computer-readable storage medium according to claim 16, wherein:
the number of the operation areas is at least two; and
the determining the profile information of the lighting system based on the operation areas includes:
respectively determining a matching degree between each two different operation areas in the at least two operation areas; and
determining the profile information of the lighting system according to an operation area having a matching degree greater than a preset matching threshold.

18. The non-transitory computer-readable storage medium according to claim 16, wherein:
the state images include at least two state sub-images of the lighting system in different operation states in each direction;
the determining operation areas where the lighting system switches operation states according to the state images in different operation states includes:
determining the operation areas where the lighting system switches operation states in each direction based on the at least two state sub-images in different operation states corresponding to each direction; and the determining the profile information of the lighting system based on the operation areas includes:

determining the profile information of the lighting system in each direction according to the operation areas corresponding to each direction.

19. The non-transitory computer-readable storage medium according to claim 15, wherein, based on configuration information of the lighting system, dividing the profile information to determine a location distribution of each lighting unit in the profile information includes:

evenly dividing the profile information into at least two setting sub-profiles according to the configuration information, each setting sub-profile corresponding to one of the lighting units.

* * * * *